(12) United States Patent
Yuasa et al.

(10) Patent No.: US 7,611,761 B2
(45) Date of Patent: Nov. 3, 2009

(54) VACUUM HEAT INSULATING MATERIAL AND REFRIGERATING APPARATUS INCLUDING THE SAME

(75) Inventors: Akiko Yuasa, Kyoto (JP); Yasuaki Tanimoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 610 days.

(21) Appl. No.: 10/595,054

(22) PCT Filed: Aug. 20, 2004

(86) PCT No.: PCT/JP2004/012320

§ 371 (c)(1),
(2), (4) Date: Jan. 19, 2006

(87) PCT Pub. No.: WO2005/061946

PCT Pub. Date: Jul. 7, 2005

(65) Prior Publication Data

US 2006/0263585 A1 Nov. 23, 2006

(30) Foreign Application Priority Data

Dec. 19, 2003 (JP) .............................. 2003-422527

(51) Int. Cl.
*B32B 18/00* (2006.01)
*A47J 39/00* (2006.01)

(52) U.S. Cl. .................. 428/34.1; 428/34.5; 428/69; 220/592.01; 220/592.02; 220/592.27

(58) Field of Classification Search ........................ None
See application file for complete search history.

(56) References Cited

U.S. PATENT DOCUMENTS

| 4,636,415 | A | 1/1987 | Barito et al. |
| 5,591,505 | A | 1/1997 | Rusek |
| 6,938,968 | B2* | 9/2005 | Tanimoto et al. ............ 312/406 |
| 7,485,352 | B2* | 2/2009 | Yuasa et al. ................ 428/34.1 |
| 2003/0157284 | A1 | 8/2003 | Tanimoto |
| 2004/0253406 | A1* | 12/2004 | Hayashi et al. ............... 428/69 |

FOREIGN PATENT DOCUMENTS

| CN | 86100942 | 8/1986 |
| CN | 1425116 | 6/2003 |
| JP | H07/139691 A | 5/1995 |
| JP | H07/167376 A | 7/1995 |
| JP | 2002/310383 A | 10/2002 |

OTHER PUBLICATIONS

International Search Report of PCT/JP04/012320.

* cited by examiner

*Primary Examiner*—Jill Gray
(74) *Attorney, Agent, or Firm*—Wenderoth, Lind & Ponack, L.L.P.

(57) ABSTRACT

Vacuum heat insulating material having core material consisting of inorganic fibers and exterior covering material for storing the core material. The inorganic fibers include silicon oxide as a main component. The surface of the inorganic fibers has Si—OH/Si—O ratio equal to or higher than 0.1 and equal to or lower than 20. The vacuum heat insulating material has intersecting points at which the fibers are adhered to one another by an intermolecular interaction due to Si—OH groups.

13 Claims, 3 Drawing Sheets

VACUUM HEAT INSULATING MATERIAL AND REFRIGERATING APPARATUS INCLUDING THE SAME

THIS APPLICATION IS A U.S. NATIONAL PHASE APPLICATION OF PCT INTERNATIONAL APPLICATION PCT/JP2004/012320, filed Aug. 20, 2004.

TECHNICAL FIELD

The present invention relates to a vacuum heat insulating material, and refrigerator/freezers and refrigeration equipments using the vacuum heat insulating material.

BACKGROUND ART

Recently, energy saving has been desired in view of the significance of preventing global warming as a global environmental problem. Thus, consumer apparatuses also have been developed so as to have improved energy saving performance. Refrigerator/freezers in particular have required heat insulating material having superior heat insulation performance from the viewpoint of an efficient use of cold heat.

Generally, heat insulating material uses fiber material such as glass wool or a foam material such as urethane foam. In order to improve the heat insulation performances of these heat insulating materials, the thicknesses of the heat insulating materials must be increased. However, the thick materials cannot be used when a space that can be filled with such heat insulating material is limited and thus the space needs to be saved or must be used effectively.

One of the means for solving the problem as described above is a vacuum heat insulating material composed of a core material for maintaining the space and exterior covering material for blocking the space form outside air. The core material generally includes powder materials, fiber materials, or foam materials containing continuous bubbles, for example. With the recent demand for increased energy saving, a vacuum heat insulating material having a further higher performance has been required.

Generally, heat conduction is represented by the sum of gas heat conduction, solid heat conduction, radiation heat conduction, and convection heat conduction. In a vacuum heat insulating material in which interior of the exterior covering material is depressurized, influence by gas heat conduction and convection heat conduction are almost ignorable. Furthermore, almost no contribution by radiation heat conduction is caused in a temperature region equal to or lower than an ordinary temperature.

Thus, when a vacuum heat insulating material is used for a refrigerator/freezer having a temperature equal to or lower then an ordinary temperature, it is required to consider the reduction of solid heat conduction. Up to now, various fiber materials have been reported as vacuum insulation core materials having superior heat insulation performance.

For example, Japanese Translation of PCT Publication No. H11-506708 discloses a vacuum heat insulating material that uses, as the core material, a fiber assembly structure in which thermoplastic inorganic binder (e.g., low melting glass composition, boric acid) is dispersed in the fiber. As shown in FIG. 4, in conventional fiber two adjacent glass fiber 1 and glass fiber 2 are fixed at intersecting point 4 by inorganic binder 3 via bonding material 5. Japanese Translation of PCT Publication No. H11-506708 discloses that, by using the inorganic binder as bonding material, the individual fibers in fiber assembly are collectively maintained so that the assembly has integrity to provide a resultant product such as a blanket of heat insulating material, a mat, heat heat insulating material, or a panel. Japanese Translation of PCT Publication No. H11-506708 also discloses that this material has superior heat insulation performance because, in contrast with conventional organic binder, no gas is generated by the binder under a vacuum condition in exterior covering material to prevent aged deterioration of the heat insulation performance.

Japanese Patent Unexamined Publication No. H07-167376 discloses a vacuum heat insulating material having core material. This core material is obtained by subjecting inorganic fibers having average fiber diameter of 2 μm or less (preferably 1 μm or less) to an acid aqueous solution processing and compression dehydration processing. Then, eluted components of the inorganic fibers are collected at intersecting points of the inorganic fibers so that they function as binder to cause the inorganic fibers to be bound to one another. Japanese Patent Unexamined Publication No. H7-167376 describes this structure as having superior heat insulation performance because of the following reason. Specifically, this structure is free from aged deterioration of the heat insulation performance due to the structure having no binder for binding fibers to one another, thus eliminating gas caused from the binder under vacuum condition in exterior covering material.

Japanese Patent Unexamined Publication No. H7-139691 also discloses a vacuum heat insulating material having core material. This core material is obtained by the following procedure. First, a plurality of papers obtained by acid sheet-making of inorganic fibers having average fiber diameter of 2 μm or less (preferably 1 μm or less) are layered in an acid condition. Then, the obtained layers are subjected to a compression process so that eluted components from these fibers are used to bind the inorganic fibers to one another at the respective intersecting points. According to Japanese Patent Unexamined Publication No. H7-139691, this structure can provide a vacuum heat insulating material having superior heat insulation performance due to the following reason. Specifically, this structure is free from aged deterioration of the heat insulation performance and has an arrangement in which the fibers are provided in a direction vertical to heat transmission direction, thereby reducing solid heat conduction.

However, in any one of the above conventional examples, inorganic fibers are bound to one another by binder or bound by using eluted components from the inorganic fibers as binder. This leads to an observation that the above structures increase solid heat conduction among the respective fibers via bound intersecting points, resulting in increased solid heat transmission components compared with a case of fiber material having no binder component.

In the case of fiber in which intersecting points are not bound, on the contrary, solid heat transmission components are suppressed, but the fiber is like cotton and thus is very difficult to handle. Furthermore, this kind of material cannot maintain a shape such as a blanket, a mat, or a panel. Thus, if this material is used as core material of a vacuum heat insulating material, the appearance is deteriorated because of air compression.

SUMMARY OF THE INVENTION

A vacuum heat insulating material of the present invention comprises a core material consisting of inorganic fibers and exterior covering material having gas barrier performance, the vacuum heat insulating material being provided by depressurizing interior of the exterior covering material. The inorganic fibers include silicon oxide as a main component;

and the core material has intersecting points at which the fibers are adhered to one another via an intermolecular interaction.

As a result, the high-performance vacuum heat insulating material having superior heat insulation performance can be provided to contribute to the energy saving of refrigerator/freezer and refrigeration equipment.

DETAILED DESCRIPTION OF PREFERRED EMBODIMENTS

Figure 1:
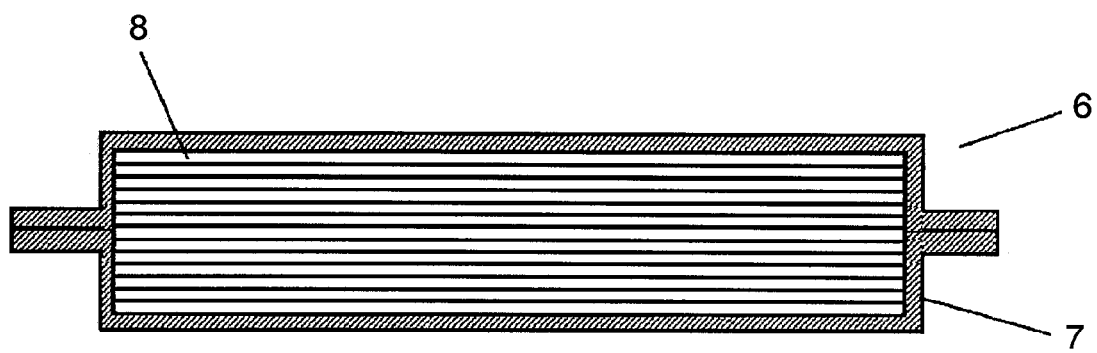
FIG. 1 is a cross-sectional view illustrating a vacuum heat insulating material in one embodiment of the present invention.

In a vacuum heat insulating material of the present invention, core material includes silicon oxide as a main component and the adhesiveness of a surface layer of inorganic fibers is improved, thus allowing the fibers to be adhered to one another by intermolecular interaction. Specifically, the intermolecular interaction due to the molecular structure allows the fibers to be adhered to one another by the attraction force from the respective fibers. In contrast with the conventional example, the vacuum heat insulating material of the present invention does not include binder or eluted components of inorganic fibers at intersecting points of inorganic fibers and thus does not promote the solid heat conduction among the fibers. Thus, the present invention can reduce solid heat conduction in the fiber and can provide the vacuum heat insulating material having superior heat insulation performance. Herein, the term "core material" denotes fiber material formed to have a plate-like shape.

Furthermore, the vacuum heat insulating material of the present invention is free from the deterioration of the heat insulation performance due to increased internal pressure caused by gas generated from binder. Thus, the present invention can provide high-performance the vacuum heat insulating material.

Furthermore, the structure of the present invention can also reduce gas heat conductivity. In the case of a conventional core material, extremely large openings that are formed in a step for manufacturing the core material and that are unevenly distributed frequently remain even after the vacuum heat insulating material is prepared and is applied with a pressing force by an atmospheric pressure. This has been considered to be a cause of the degradation of gas heat conduction. In contrast to this, the structure of the present invention eliminates the binding of fibers at fiber intersecting points, thus allowing the entire fiber material to be subjected to compression by air so that openings have substantially uniform diameters. As a result, extremely large openings are prevented from being caused to provide minute and uniform openings, thus further reducing the gas heat conductivity.

By the above effects, a vacuum heat insulating material having heat insulation performance that is 10 times higher than the performance of conventional rigid urethane foam can be provided.

The vacuum heat insulating material of the present invention is also provided so that fibers are adhered to one another by intermolecular interaction in which fibers are attracted to one another. This can provide a sufficient strength required for maintaining structured body that can be handled easily. This also prevents, when the vacuum heat insulating material is used as core material of the vacuum heat insulating material, the vacuum heat insulating material from having a deteriorated appearance due to air compression.

When a microscope or the like is used to observe conventional examples in which binders or eluted components of inorganic fibers are bound at intersecting points of inorganic fibers, binders or binding products of eluted components are clearly observed at the surface of fibers or the intersecting points. When the adhesion by the intermolecular interaction in the present invention is used, on the other hand, sufficient strength required for maintaining a structured body can be obtained regardless of the fact that no physical presence having influence on the adhesion is observed at all. This adhesion is provided by the intermolecular interaction by hydrogen bonding or van der Waals force, for example.

Furthermore, inorganic fibers in the present invention that includes silicon oxide as a main component mean inorganic fibers (e.g., glass wool, silica fibers) in which silicon oxide is involved with the highest proportion. The inorganic fibers of the present invention may include alumina, sodium oxide, boron oxide or the like as a sub component. Commercially-low-cost glass wool is particularly preferable.

As disclosed by the conventional example, the smaller the diameter of inorganic fiber has, the higher the heat insulation performance becomes. However, the conventional example could secure the heat insulation performance only when core material consisting of inorganic fibers has fiber diameter equal to or lower than 2 µm. In contrast to this, the vacuum heat insulating material of the present invention can provide a sufficient heat insulation performance even when core material having fiber diameter equal to or higher than 3 µm is used. Thus, in order to satisfy both of requirements of low cost and superior heat insulation performance, the fiber diameter from 3 µm to 4 µm is desirable. It is noted that the technical concept of the present invention can be applied to fiber having any diameter.

Material having gas barrier performance can be used as the exterior covering material of the present invention. A laminate film composed of a surface protection layer, a gas barrier layer, and heat adhesion layer is especially preferable.

Furthermore, the vacuum heat insulating material of the present invention may include, in addition to core material, physical adsorption agents (e.g., synthetic zeolite, activated charcoal, activated alumina, silica gel, dawsonite, hydrotalcite), chemical absorption agents (e.g., alkali metals, alkali earth metals, alkali metal oxides, alkali earth metal oxides, alkali metal hydroxide, or alkali earth metal hydroxide), moisture absorption agents, or gas absorption agents enclosed in a exterior covering material.

In the present invention, the intermolecular interaction is provided by Si—OH group and the Si—OH/Si—O ratio of the surface of inorganic fibers may be equal to or higher than 0.1 and equal to or lower than 20. The hydrogen bonding provided by Si—OH group can be used as an intermolecular interaction to provide sufficient intermolecular interaction force required for the adhesion among inorganic fibers to one another. This provides sufficient force to maintain a structured body that can be handled easily.

In order to provide the Si—OH/Si—O ratio of the surface of inorganic fibers equal to or higher than 0.1 and equal to or lower than 20, suitable amount of moisture may be provided to the surface of the fibers until the core material of the vacuum heat insulating material is sealed under reduced pressure. The supply of moisture causes a chemical change of Si—$O_2$ groups at the surface of the fibers to Si—OH groups and a part thereof to Si—$H_3O^+$ groups. This change is desirably carried out immediately after fiber structuring process at which fibers are in relatively high temperature and are chemically unstable.

Next, core material having favorable appearance of the vacuum heat insulating material is prepared. Specifically, fibers consisting of inorganic fibers having Si—OH groups and Si—$H_3O^+$ groups at the surface is prepared at first. Then, the fiber material is subjected to heat compression to obtain a structured body that can be handled easily. This structured body is used as core material. The wording "core material having favorable appearance" herein means core material by which the heat insulating material may have a smooth surface. When the inner face of an outer box of a heat insulation box of a refrigerator is adhered with a vacuum heat insulating material and the space between the inner box and the outer box is filled with heat insulation foam, convexities and concavities at the surface of the vacuum heat insulating material tend to appear as convexities and concavities at the outer box of the refrigerator. When the thickness of an adhesive agent is increased until convexities and concavities at the surface of the vacuum heat insulating material are covered, on the other hand, the heat insulation box becomes to have deteriorated heat insulation performance. Thus, core material by which heat insulating material can have a smooth surface is preferable. By subjecting the fiber to heat compression to have an appropriate density, fibers adjacent to one another are adhered by the hydrogen bonding, thereby providing a structured body. When the fiber material is heated while being compressed, the dehydration reaction may change Si—$H_3O^+$ groups to Si—OH groups. Thus, the Si—OH/Si—O ratio of obtained core material is preferably equal to or higher than 0.1 and equal to or lower than 20. The processing as described above provide a sufficient strength required for maintaining a structured body that can be handled easily.

It is noted that the Si—OH/Si ratio of the surface of inorganic fibers can be calculated by the X-ray photoelectron spectroscopy (XPS) or the Fourier transform infrared emission spectroscopy (FT-IR). The XPS measures Si2p spectrum and O1s spectrum to make comparison between peak areas of the former and the latter. The FT-IR measures Si—OH spectrum and SiO spectrum to make relative comparison between the areas of these spectra.

In the present invention, core material consisting of inorganic fibers preferably has fiber density of 150 kg/$m^3$ or higher and 300 kg/$m^3$ or less. The term "fiber density" herein means apparent density of the core material as assembly of fibers.

By using core material having the density as described above, hardness can be provided to the core material. As a result, the core material can be handled in a favorable manner and thus workability in a step for inserting the core material to exterior covering material is improved and the vacuum heat insulating material has favorable surface property. Even when the core material has increased density, the solid heat conductivity is not increased.

A refrigerator/freezer and a refrigeration equipment of the present invention have the vacuum heat insulating material of the present invention. The vacuum heat insulating material of the present invention has superior heat insulation performance that is 10 times higher than conventional rigid urethane foam. Thus, the higher heat insulation of the refrigerator/freezer and the refrigeration equipment is achieved, and contribution to energy saving is realized. Furthermore, the vacuum heat insulating material has favorable surface property and can be attached with superior workability, thus providing a smooth surface to the box bodies of the refrigerator/freezer and the refrigeration equipment.

Furthermore, the present invention does not use binder and does not cause deteriorated heat insulation performance due to increased internal pressure because of gas generated from binder. Thus, the present invention does not cause aged deterioration of the heat insulation performance and can continuously contribute to energy saving.

Conventional vacuum heat insulating material is formed by adhering inorganic fibers to one another by using binder. On the other hand, fibers of the vacuum heat insulating material of the present invention are adhered to one another by using a phenomenon in which inorganic fibers are attracted to one another by intermolecular interaction. Since the present invention improves the adhesiveness of surface layer of the inorganic fibers, the present invention can prevent deterioration of heat insulation performance due to gas generated from binder and can suppress increase of the solid heat conductivity via bound parts at fiber intersecting points, thus providing high-performance vacuum heat insulating material having superior heat insulation performance.

Hereinafter, specific embodiments of the present invention will be described with reference to the drawings. It is noted that this invention is not limited to these embodiments.

Embodiment 1

Figure 2:
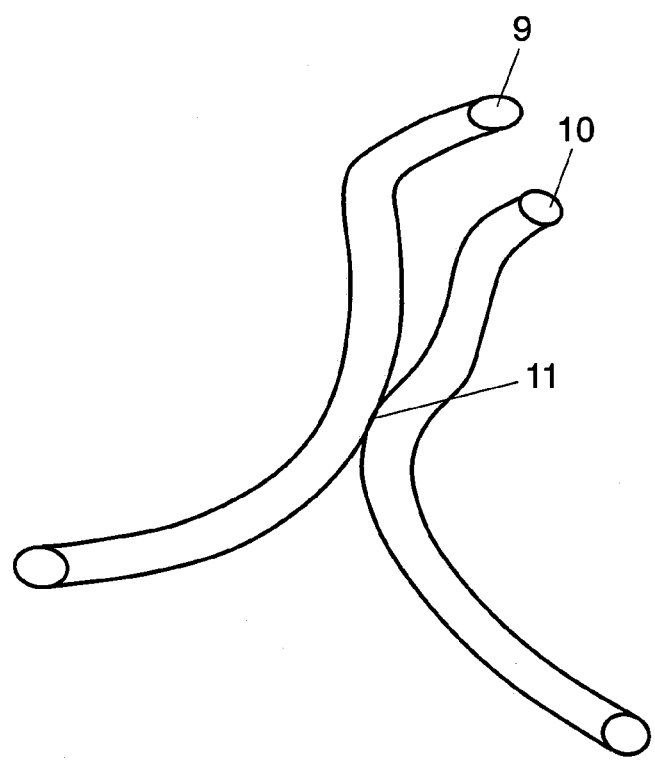
FIG. 2 is a schematic view illustrating an intersecting point in core material in one embodiment of the present invention.

FIG. 1 is a cross-sectional view illustrating a vacuum heat insulating material in Embodiment 1 of the present invention. Vacuum heat insulating material 6 is provided by filling core material 8 into exterior covering material 7 under reduced pressure. Core material 8 includes silicon oxide as a main component and is provided so that inorganic fibers are adhered to one another by the attraction force due to the intermolecular interaction. FIG. 2 is a schematic view illustrating an intersecting point at which inorganic fibers are attracted to each other by the intermolecular interaction. Two neighboring inorganic fiber 9 and inorganic fiber 10 are adhered to each another by the intermolecular interaction. Since the fibers are adhered to each other via the intermolecular force, intersecting point 11 shows no bound materials. In spite of this, this vacuum heat insulating material can obtain sufficient strength as a structured body so that the structured body can be handled appropriately.

In the vacuum heat insulating material of embodiment example 1, intersecting points of inorganic fibers do not have binder or eluted components of the inorganic fiber and thus does not cause solid heat transfer at the fiber intersecting points. Thus, the vacuum heat insulating material of embodiment example 1 can reduce solid heat conduction, providing superior heat insulation performance.

Furthermore, the vacuum heat insulating material of embodiment 1 does not cause deteriorated heat insulation performance due to increased internal pressure caused by gas generated from binder.

Furthermore, the vacuum heat insulating material of embodiment 1 does not bind fibers by binder at fiber intersecting points. Thus, the vacuum heat insulating material is compressed in air so as to have openings having almost uniform diameter to eliminate an extremely large opening and to provide uniform minute openings, thus further reducing the gas heat conductivity.

By the above effects, the vacuum heat insulating material having heat insulation performance that is 10 times higher than the performance of conventional rigid urethane foam can be provided.

The vacuum heat insulating material of embodiment 1 is also provided so that fibers are adhered to one another by the intermolecular interaction in which fibers are attracted to one another. This can provide a sufficient strength required for maintaining a structured body that can be handled easily. When the fiber structure of the present invention is used as core material of a vacuum heat insulating material, the vacuum heat insulating material is prevented from having a damaged appearance due to air compression.

Embodiment example 1 to embodiment example 7 show the result of the evaluation of the vacuum heat insulating materials having different Si—OH/Si—O ratios and different fiber densities of the core material consisting of inorganic fibers.

For the evaluation of the performance of the handling of the core material and the surface property of the vacuum heat insulating material, bending strength and compression strength were observed as evaluation indexes. Based on empirical date, it was determined that sufficient performance is obtained when bending strength is 0.03 MPa or more and compression strength is 0.05 MPa.

In this evaluation, observed heat conductivities were compared with actual measurement values at average temperature of 24 degree Celsius. The result of the experiment is summarized in Table 1.

EMBODIMENT EXAMPLE 1

A glass wool structured body was used as core material that has Si—OH/Si—O ratio of 0.1 calculated by a peak area ratio of Si2p spectrum and O1s spectrum by XPS and that has fiber density of core material of 250 kg/m$^3$. A laminate film was used as exterior covering material that has a metallized film layer and a thermoplastic polymer layer. These core material and exterior covering material were used to form a vacuum heat insulating material in which the core material had average fiber diameter of 4 μm. The evaluation thereof showed compression strength of core material of 0.06 MPa, bending strength of the core material of 0.04 MPa, and heat conductivity of the vacuum heat insulating material of 0.0013 W/mK.

By providing the Si—OH/Si—O ratio of the inorganic fiber surface equal to or higher than 0.1 and equal to or lower than 20, fibers are attracted to one another by the intermolecular interaction to be strongly adhered to one another. The vacuum heat insulating material can obtain sufficient adhesion strength required to maintain a structured body. Thus, the vacuum heat insulating material is handled easily and is prevented from having a damaged appearance due to air compression when used as core material of the vacuum heat insulating material.

Furthermore, the vacuum heat insulating material does not cause increased solid heat conductivity due to fiber binding by binder at fiber intersecting points. Since the vacuum heat insulating material of the present embodiment is free from fiber binding by binder at fiber intersecting points, the vacuum heat insulating material can be pressed by air so as to have almost uniform opening diameters. The formed uniform minute openings reduce the gas heat conductivity, thereby showing a heat insulation performance higher than those of comparison example 1 to comparison example 3.

EMBODIMENT EXAMPLE 2

A glass wool structured body was used as core material that has Si—OH/Si—O ratio of 0.6 calculated by a peak area ratio of Si2p spectrum and O1s spectrum by XPS and that has fiber density of core material of 250 kg/m$^3$. A laminate film was used as exterior covering material that has a metallized film layer and a thermoplastic polymer layer. These core material and exterior covering material were used to form the vacuum heat insulating material.

This vacuum heat insulating material showed average fiber diameter of the core material of 4 μm. The evaluation thereof showed compression strength of the core material of 0.07 MPa, bending strength of the core material of 0.05 MPa, and heat conductivity of the vacuum heat insulating material of 0.0013 W/mK.

Embodiment example 2 showed a slight increase in the compression strength and bending strength than those of embodiment example 1. This increase is presumably caused by the increase of Si—OH/Si—O ratio.

EMBODIMENT EXAMPLE 3

A glass wool structured body was used as core material that has Si—OH/Si—O ratio of 0.9 calculated by a peak area ratio of Si2p spectrum and O1s spectrum by XPS and that has fiber density of core material of 250 kg/m$^3$. A laminate film was used as exterior covering material that has a metallized film layer and a thermoplastic polymer layer. These core material and exterior covering material were used to form a vacuum heat insulating material in which the core material had average fiber diameter of 4 μm. The evaluation thereof showed compression strength of the core material of 0.07 MPa, bending strength of the core material of 0.06 MPa, and heat conductivity of the vacuum heat insulating material of 0.0013 W/mK.

Embodiment example 3 showed a slight increase in the compression strength and bending strength than those of embodiment example 1. This increase is presumably caused by the increase of Si—OH/Si—O ratio. Embodiment example 3 also showed substantially the same strength as that of embodiment example 2.

EMBODIMENT EXAMPLE 4

A glass wool structured body was used as core material that has Si—OH/Si—O ratio of 0.6 calculated by a peak area ratio of Si2p spectrum and O1s spectrum by XPS and that has fiber density of core material of 150 kg/m$^3$. A laminate film was used as exterior covering material that has a metallized film layer and a thermoplastic polymer layer. These core material and exterior covering material were used to form a vacuum heat insulating material in which the core material had average fiber diameter of 4 μm. The evaluation thereof showed compression strength of the core material of 0.05 MPa, bending strength of the core material of 0.03 MPa, and heat conductivity of the vacuum heat insulating material of 0.0012 W/mK.

Embodiment example 4 showed slight reduction in the heat conductivity than that of embodiment example 2 having equivalent Si—OH/Si—O ratio. This reduction is presumably caused by the decrease of the solid heat conductivity due to the decrease of the density. When the density is 150 kg/m$^3$, the compression strength and the bending strength were sufficient to maintain a structured body that can be handled easily.

EMBODIMENT EXAMPLE 5

A glass wool structured body was used as core material that has Si—OH/Si—O ratio of 0.6 calculated by a peak area ratio of Si2p spectrum and O1s spectrum by XPS and that has fiber density of core material of 300 kg/m$^3$. A laminate film was used as exterior covering material that has a metallized film layer and a thermoplastic polymer layer. These core material and exterior covering material were used to form a vacuum heat insulating material in which the core material had average fiber diameter of 4 μm. The evaluation thereof showed compression strength of the core material of 0.08 MPa, bending strength of the core material of 0.07 MPa, and heat conductivity of the vacuum heat insulating material of 0.0014 W/mK.

Embodiment example 5 showed increase in the compression strength and bending strength than those of embodiment example 2 having equivalent Si—OH/Si—O ratio. This increase is presumably caused by the increase of the density. Embodiment example 5 also showed slight increase in the heat conductivity. However, the difference at this level does not have influence on the deterioration of solid heat conduction.

EMBODIMENT EXAMPLE 6

A glass wool structured body was used as core material that has Si—OH/Si—O ratio of 0.6 calculated by a peak area ratio of Si2p spectrum and O1s spectrum by XPS and that has fiber density of core material of 350 kg/m$^3$. A laminate film was used as exterior covering material that has a metallized film layer and a thermoplastic polymer layer. These core material and exterior covering material were used to form a vacuum heat insulating material in which the core material had average fiber diameter of 4 μm. The evaluation thereof showed compression strength of the core material of 0.08 MPa, bending strength of the core material of 0.07 MPa, and heat conductivity of the vacuum heat insulating material of 0.0015 W/mK. Embodiment example 6 showed compression strength and bending strength equivalent to those of embodiment example 5. Embodiment example 6 also showed increased heat conductivity. This is caused by the increased density. Although embodiment example 6 begins to show a tendency to increase the solid heat conduction, the value of the solid heat conduction is at an acceptable level.

EMBODIMENT EXAMPLE 7

A glass wool structured body was used as core material that has Si—OH/Si—O ratio of 0.6 calculated by a peak area ratio of Si2p spectrum and O1s spectrum by XPS and that has fiber density of core material of 380 kg/m$^3$. A laminate film was used as exterior covering material that has a metallized film layer and a thermoplastic polymer layer. These core material and exterior covering material were used to form a vacuum heat insulating material in which the core material had average fiber diameter of 4 μm. The evaluation thereof showed compression strength of the core material of 0.08 MPa, bending strength of the core material of 0.07 MPa, and heat conductivity of the vacuum heat insulating material of 0.0015 W/mK.

Embodiment example 7 showed compression strength and bending strength equivalent to those of embodiment example 5 and embodiment example 6. Embodiment example 7 also showed increased heat conductivity. Although embodiment example 7 begins to show a tendency to increase the solid heat conduction, the value of the solid heat conduction is at an acceptable level.

EMBODIMENT EXAMPLE 8

A glass wool structured body was used as core material that has Si—OH/Si—O ratio of 0.6 calculated by a peak area ratio of Si2p spectrum and O1s spectrum by XPS and that has fiber density of core material of 80 kg/m$^3$. A laminate film was used as exterior covering material that has a metallized film layer and a thermoplastic polymer layer. These core material and exterior covering material were used to form a vacuum heat insulating material.

The evaluation thereof showed compression strength of the core material of 0.01 MPa or less, bending strength of the core material of 0.01 MPa or less, and heat conductivity of the vacuum heat insulating material of 0.0015 W/mK. The reason is that the structured body has a reduced strength due to the core material density of 80 kg/m$^3$. Thus, embodiment example 8 showed superior heat conductivity but showed poor handling and deteriorated surface property of the vacuum heat insulating material.

EMBODIMENT EXAMPLE 9

A glass wool structured body was used as core material that has Si—OH/Si—O ratio of 0.07 calculated by a peak area ratio of Si2p spectrum and O1s spectrum by XPS and that has fiber density of core material of 150 kg/m$^3$. A laminate film was used as exterior covering material that has a metallized film layer and a thermoplastic polymer layer. These core material and exterior covering material were used to form a vacuum heat insulating material. The evaluation thereof showed compression strength of the core material of 0.03 MPa, bending strength of the core material of 0.02 MPa, and heat conductivity of the vacuum heat insulating material of 0.0015 W/mK. It was difficult to provide, even by compression molding, a structured body having a density higher than 150 kg/m$^3$. The reason is presumably that the Si—OH/Si—O ratio smaller than 0.1 causes small adhesion force by an intermolecular interaction. Thus, the vacuum heat insulating material of embodiment example 9 showed superior heat conductivity but showed poor handling and deteriorated surface property.

Next, comparison examples to the vacuum heat insulating material of the present invention will be shown. Table 1 shows the result of experiments using the same measurement method as those of the embodiment examples.

COMPARISON EXAMPLE 1

A glass wool structured body was used as core material in which boric acid binders are dispersed to bind fibers at intersecting points and that has fiber density of core material of 250 kg/m$^3$. A laminate film was used as exterior covering material that has a metallized film layer and a thermoplastic polymer layer. These core material and exterior covering material were used to form a vacuum heat insulating material in which the core material had average fiber diameter of 4 μm. The evaluation thereof showed compression strength of the core material of 0.07 MPa, bending strength of the core material of 0.06 MPa, and heat conductivity of the vacuum heat insulating material of 0.0022 W/mK.

Although comparison example 1 showed sufficient compression strength and bending strength, comparison example 1 showed heat conductivity higher than those of the present embodiments. The reason is that the dispersed boric acid binders bind fibers at intersecting points to increase the solid heat conduction via the fiber binding by binder.

COMPARISON EXAMPLE 2

A glass wool structured body was used as core material in which inorganic fibers having average fiber diameter of 1 μm are subjected to an acid aqueous solution processing and compression dehydration processing to collect eluted components of the inorganic fibers at intersecting points of the inorganic fibers to provide a function as bonding material and that has fiber density of core material of 250 kg/m$^3$. A laminate film was used as exterior covering material that has a metallized film layer and a thermoplastic polymer layer. These core material and exterior covering material were used to form a vacuum heat insulating material. The evaluation thereof showed compression strength of the core material of 0.07 MPa, bending strength of the core material of 0.06 MPa, and heat conductivity of the vacuum heat insulating material of 0.0033 W/mK.

Although comparison example 2 shows sufficient compression strength and bending strength, comparison example 2 has heat conductivity that is much higher than those of the present embodiments. The reason is that the eluted components of the inorganic fibers function as bonding material at the intersecting points and thus heat conduction among the inorganic fibers is performed via the bonding material, thereby increasing the solid heat conductivity. Thus, the effect by the minute fiber diameter is canceled.

COMPARISON EXAMPLE 3

A glass wool structured body was used as core material in which a plurality of papers obtained by acid sheetmaking of inorganic fibers having average fiber diameter of 1 μm are layered in acid condition. Then, the obtained layers are subjected to compression processing so that the inorganic fibers are bound at the respective intersecting points by components eluted from these fibers and that has fiber density of core material of 250 kg/m$^3$. A laminate film was used as exterior covering material that has a metallized film layer and a thermoplastic polymer layer. These core material and exterior covering material were used to form a vacuum heat insulating material. The evaluation thereof showed compression strength of the core material of 0.07 MPa, bending strength of the core material of 0.06 MPa, and heat conductivity of the vacuum heat insulating material of 0.0022 W/mK.

Although comparison example 3 shows sufficient compression strength and bending strength, comparison example 3 has heat conductivity that is much higher than those of the present embodiments. This is because the inorganic fibers are bound each other at the respective intersecting points by components eluted from these fibers. By layering the plurality of papers obtained by the acid sheetmaking in acid condition, an effect is provided in which fibers are arranged in a direction orthogonal to the direction of heat transmission. Although the effect gives heat conductivity smaller than that of comparison example 2, the heat conductivity is still larger than those of the present embodiment examples 1 to 9.

TABLE 1

| | Si—OH/ Si—O ratio | Density (kg/m$^3$) | Fiber diameter (μm) | Bonding at fiber intersecting point | Compression strength (MPa) | Bending strength (MPa) | Heat conductivity (W/mK) | Handling & surface property |
|---|---|---|---|---|---|---|---|---|
| example 1 | 0.1 | 250 | 4 | No binding | 0.06 | 0.04 | 0.0013 | good |
| example 2 | 0.6 | 250 | 4 | No binding | 0.07 | 0.05 | 0.0013 | Good |
| example 3 | 0.9 | 250 | 4 | No binding | 0.07 | 0.06 | 0.0013 | Good |
| example 4 | 0.6 | 150 | 4 | No binding | 0.05 | 0.03 | 0.0012 | Good |
| example 5 | 0.6 | 300 | 4 | No binding | 0.08 | 0.07 | 0.0014 | Good |
| example 6 | 0.6 | 350 | 4 | No binding | 0.08 | 0.07 | 0.0015 | Good |
| example 7 | 0.6 | 380 | 4 | No binding | 0.08 | 0.07 | 0.0015 | good |
| example 8 | 0.6 | 80 | 4 | No binding | 0.01 or less | 0.01 or less | 0.0015 | N.G. |
| example 9 | 0.07 | 150 | 4 | No binding | 0.03 | 0.02 | 0.0015 | N.G. |
| compar. example 1 | — | 250 | 4 | Boric acid Binder | 0.07 | 0.06 | 0.0022 | Good |
| compar. example 2 | — | 250 | 1 | Binding due to eluted components | 0.07 | 0.06 | 0.0033 | Good |
| compar. example 3 | — | 250 | 1 | Binding due to eluted components | 0.07 | 0.06 | 0.0026 | Good |

Embodiment 2

Figure 3:
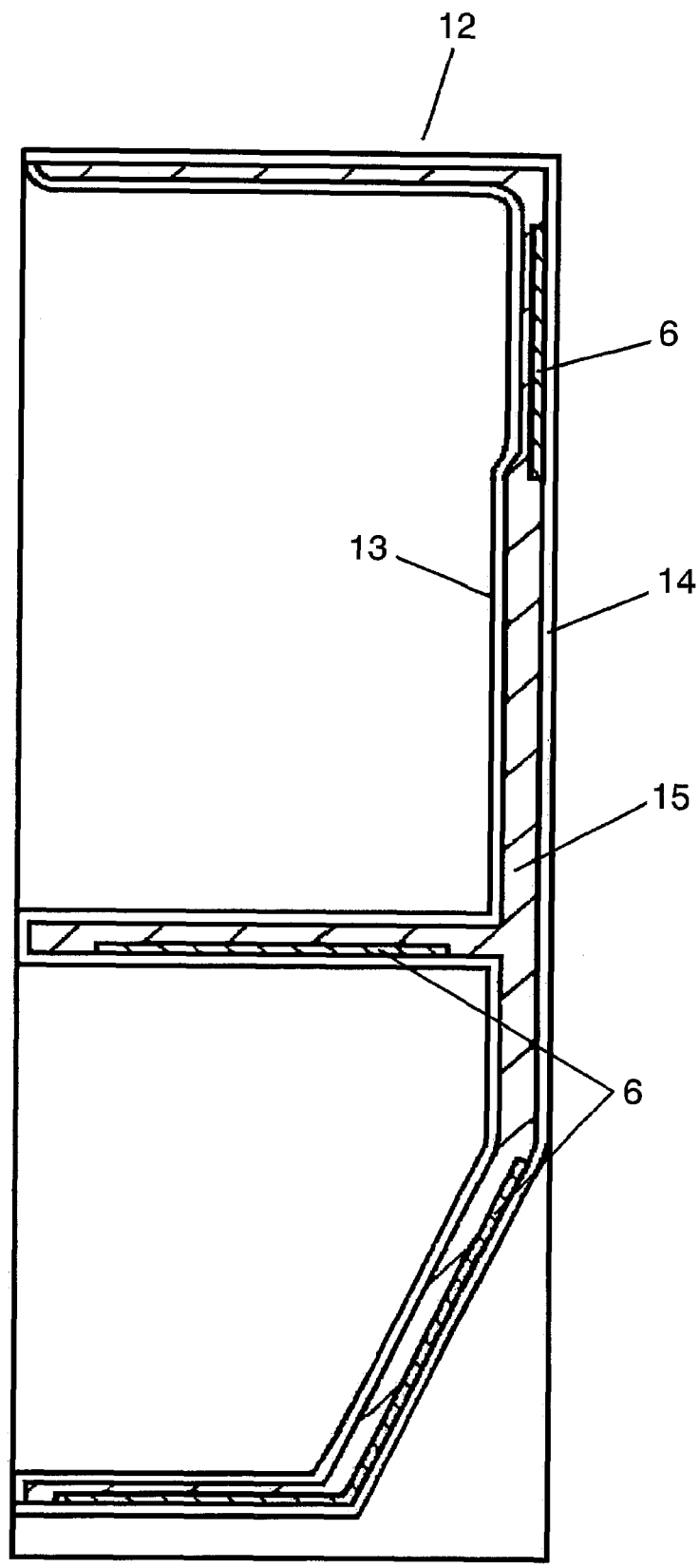
FIG. 3 is a cross-sectional view illustrating a refrigerator/freezer as one embodiment of the present invention.
Figure 4:
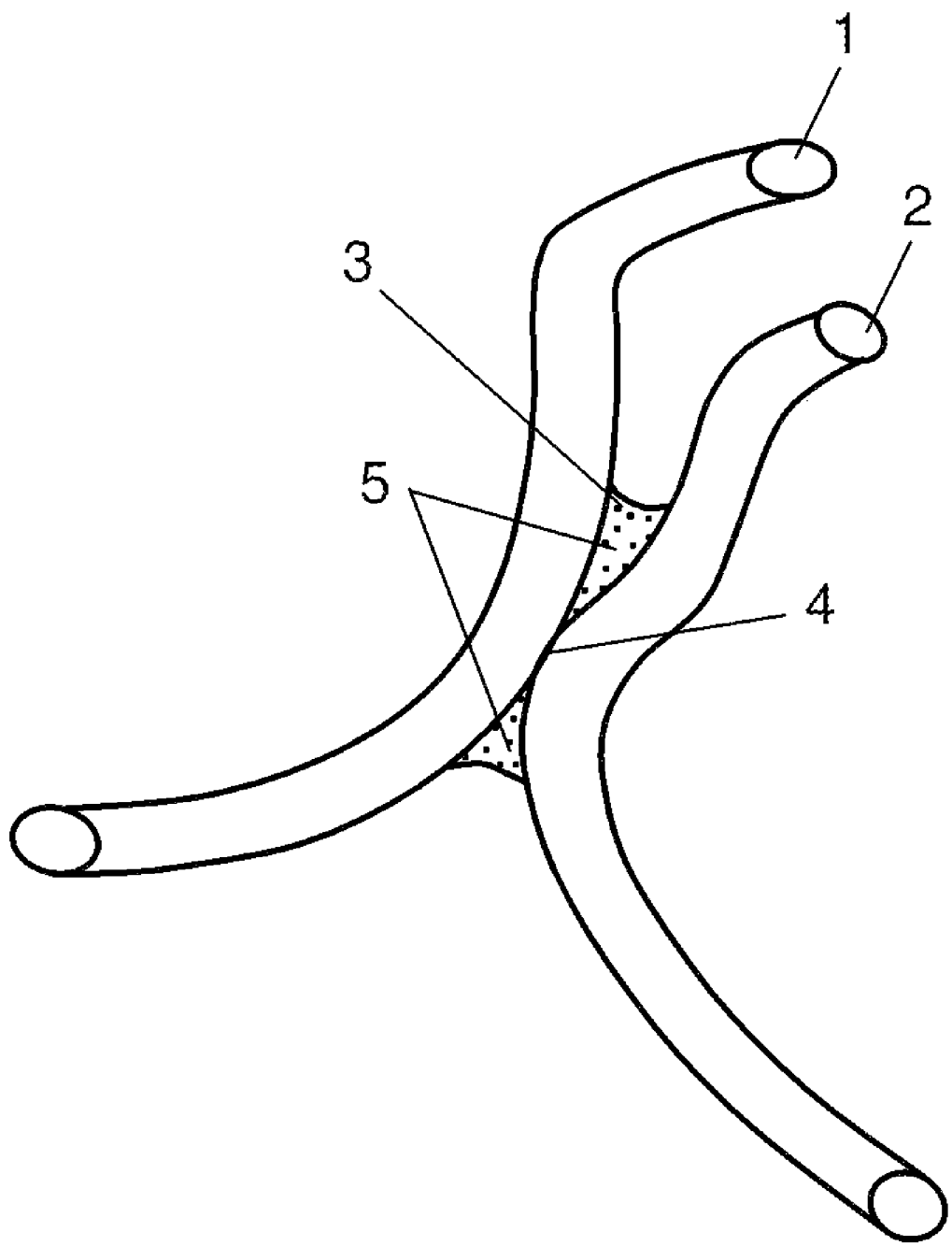
FIG. 4 is a schematic view for explaining core material of a conventional example.

FIG. 3 is a cross-sectional view illustrating a refrigerator/freezer of the present invention.

In refrigerator/freezer 12, a box composed of inner box 13 and outer box 14 previously includes vacuum heat insulating material 6 in embodiment 1 and spaces other than vacuum heat insulating material 6 are filled with rigid urethane foam 15. The refrigerator/freezer having the structure as described above has superior heat insulation performance that is 10 times or more higher than that of conventional refrigerator/freezer having rigid urethane foam, thus achieving a high heat insulation to contribute to energy saving. Fibers in vacuum heat insulating material 6 are not bound by bonding material. Thus, vacuum heat insulating material 6 does not cause a deteriorated heat insulation performance due to increased internal pressure caused by gas generated from the bonding material. As a result, vacuum heat insulating material 6 is free from aged deterioration of heat insulation performance, thus continuously contributing to energy saving.

It is noted that a refrigerator/freezer and a refrigeration equipment of the present invention mean machines using hot/cold heat operating at temperatures in a range from −30 degrees at which they operate through an ordinary temperature to a higher temperature at which an automatic vending machine operates. Furthermore, the present invention is not limited to an electrical apparatus and also may be applied to a gas apparatus.

INDUSTRIAL APPLICABILITY

As described above, the vacuum heat insulating material according to the present invention has remarkably-reduced solid heat conduction and gas heat conduction and has superior heat insulation performance that is 10 times or more superior to that of conventional rigid urethane foam. The use of the vacuum heat insulating material of the present invention can provide an efficient use of hot/cold heat. Thus, the vacuum heat insulating material of the present invention can contribute to energy saving of apparatuses such as refrigerator/freezers and refrigeration equipments and also can be used for any heat insulation applications for protecting objects from heat or cold.

The invention claimed is:

1. Vacuum heat insulating material comprising:
a core material containing inorganic fibers, wherein the inorganic fibers include silicon oxide as a main component, a Si—OH/Si—O ratio of a surface of the inorganic fibers being made equal to or higher than 0.1 and equal to or lower than 1.0 by treating the inorganic fibers with moisture, and the core material being a formed body of the inorganic fibers provided by an adhesion of the inorganic fibers to one another by an intermolecular interaction of Si—OH groups existing at the surface of the inorganic fibers; and
an exterior covering material having gas barrier performance, the vacuum heat insulating material being provided by depressurizing interior of the exterior covering material.

2. The vacuum heat insulating material according to claim 1, wherein the intermolecular interaction is Si—OH group hydrogen bonding at the surface of the inorganic fibers.

3. The vacuum heat insulating material according to claim 1, wherein the core material has a density equal to or higher than 150 kg/m$^3$ and equal to or lower than 300 kg/m$^3$.

4. The vacuum heat insulating material according to claim 1, wherein the core material has bending strength equal to or higher than 0.03 MPa and equal to or lower than 0.10 MPa.

5. The vacuum heat insulating material according to claim 1, wherein Si—OH groups are introduced to the surface of the fibers by contact between the surface of the fibers and water molecules.

6. A refrigeration equipment having a refrigerating box at least including a vacuum heat insulating material, wherein:
the vacuum heat insulating material comprises
a core material containing inorganic fibers, wherein the inorganic fibers include silicon oxide as a main component, a Si—OH/Si—O ratio of a surface of the inorganic fibers being made equal to or higher than 0.1 and equal to or lower than 1.0 by treating the inorganic fibers with moisture, and the core material being a formed body of the inorganic fibers provided by an adhesion of the inorganic fibers to one another by an intermolecular interaction of Si—OH groups existing at the surface of the inorganic fibers; and
an exterior covering material having gas barrier performance in which interior of the exterior covering material is depressurized.

7. The refrigeration equipment according to claim 6, wherein the refrigeration equipment is a refrigerator/freezer that uses the vacuum heat insulating material at least for heat insulation of a freezing compartment.

8. The refrigeration equipment according to claim 6, wherein the intermolecular interaction is Si—OH group hydrogen bonding existing at the surface of the fibers.

9. The vacuum heat insulating material according to claim 1, wherein the treatment with moisture is performed before the depressurizing of the interior of the exterior covering material.

10. The vacuum heat insulating material according to claim 1, wherein the core is formed by heat compression.

11. The vacuum heat insulating material according to claim 1, wherein the inorganic fibers have a diameter of 3 µm or higher.

12. The vacuum heat insulating material according to claim 11, wherein the inorganic fibers have a diameter of 3 to 4 µm.

13. The vacuum heat insulating material according to claim 1, wherein no binder or binding product of eluted components exists on the surface of the inorganic fibers at intersecting points.

* * * * *